(12) United States Patent
Hirakura

(10) Patent No.: US 10,769,973 B2
(45) Date of Patent: Sep. 8, 2020

(54) IMAGE DISPLAY DEVICE AND ADJUSTING DEVICE

(71) Applicant: SEIKO EPSON CORPORATION, Tokyo (JP)

(72) Inventor: Takao Hirakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 170 days.

(21) Appl. No.: 15/558,145

(22) PCT Filed: Mar. 16, 2016

(86) PCT No.: PCT/JP2016/001518
§ 371 (c)(1),
(2) Date: Sep. 13, 2017

(87) PCT Pub. No.: WO2016/157785
PCT Pub. Date: Oct. 6, 2016

(65) Prior Publication Data
US 2018/0047321 A1    Feb. 15, 2018

(30) Foreign Application Priority Data
Mar. 27, 2015  (JP) .................................. 2015-066411

(51) Int. Cl.
*G09G 3/00* (2006.01)
*G03B 21/14* (2006.01)
*H04N 9/31* (2006.01)

(52) U.S. Cl.
CPC ............ *G09G 3/007* (2013.01); *G03B 21/14* (2013.01); *H04N 9/3105* (2013.01); *H04N 9/317* (2013.01); *H04N 9/3188* (2013.01)

(58) Field of Classification Search
CPC ...... G09G 3/007; G03B 21/14; H04N 9/1305; H04N 9/317; H04N 9/3188
(Continued)

(56) References Cited

U.S. PATENT DOCUMENTS

| 6,486,711 B1* | 11/2002 | Tsay ..................... G11C 27/026 327/561 |
| 2008/0129387 A1* | 6/2008 | Nakakita .............. H03G 3/3026 330/284 |

(Continued)

FOREIGN PATENT DOCUMENTS

| JP | H02-042288 A | 2/1990 |
| JP | H0242288     * | 2/1990 |

(Continued)

OTHER PUBLICATIONS

Machine Translation of JPH0242288 (Year: 2017).*
(Continued)

*Primary Examiner* — Jerry L Brooks
(74) *Attorney, Agent, or Firm* — Oliff PLC

(57) ABSTRACT

The position of an image is varied to thereby make it possible to achieve an increase in resolution, and at the same time, easily readjust the variation. The projector includes a vibratory device functioning as an image displacement section adapted to vary the position of the image displayed by the display section, and a control section adapted to control the vibratory device. The control section is provided with a plurality of variable resistors each adapted to adjust amplitude of a drive signal adapted to control a shift amount as the variation of the position of the image due to the vibratory device.

4 Claims, 9 Drawing Sheets

(58) Field of Classification Search
USPC .......................................................... 353/98
See application file for complete search history.

(56) References Cited

U.S. PATENT DOCUMENTS

| | | | |
|---|---|---|---|
| 2009/0021110 A1* | 1/2009 | Lendaro | ............. G02B 26/0858 310/317 |
| 2009/0184775 A1* | 7/2009 | Komori | .................. H02K 33/02 331/154 |
| 2016/0091773 A1 | 3/2016 | Mizoguchi et al. | |

FOREIGN PATENT DOCUMENTS

| | | | | |
|---|---|---|---|---|
| JP | H05-115070 A | 5/1993 | | |
| JP | 2001-272630 A | 10/2001 | | |
| JP | 2007-322995 A | 12/2007 | | |
| JP | 2009-171784 A | 7/2009 | | |
| JP | 2009-284016 A | 12/2009 | | |
| JP | 2009284016 A | * 12/2009 | ............... H03G 3/20 |
| JP | 2011-158589 A | 8/2011 | | |
| JP | 2016-071232 A | 5/2016 | | |

OTHER PUBLICATIONS

Machine Translation of JP2009284016A (Year: 2017).*
Jun. 7, 2016 International Search Report issued in International Patent Application No. PCT/JP2016/001518.

* cited by examiner

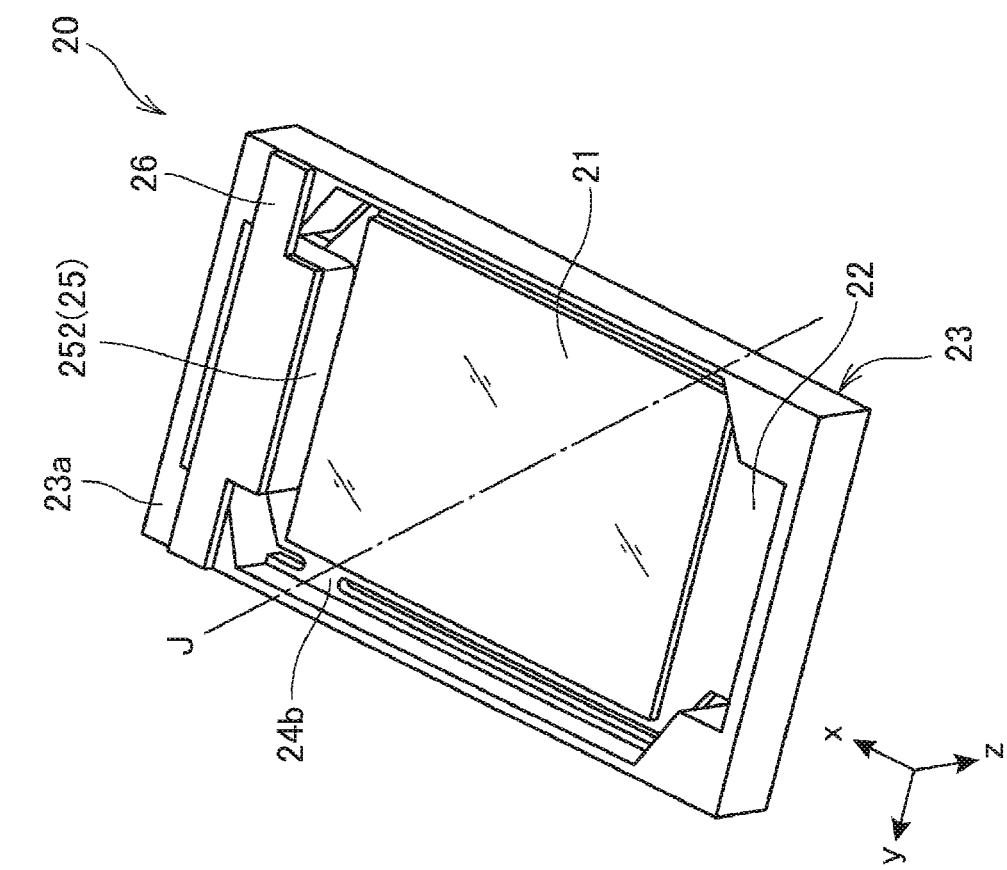
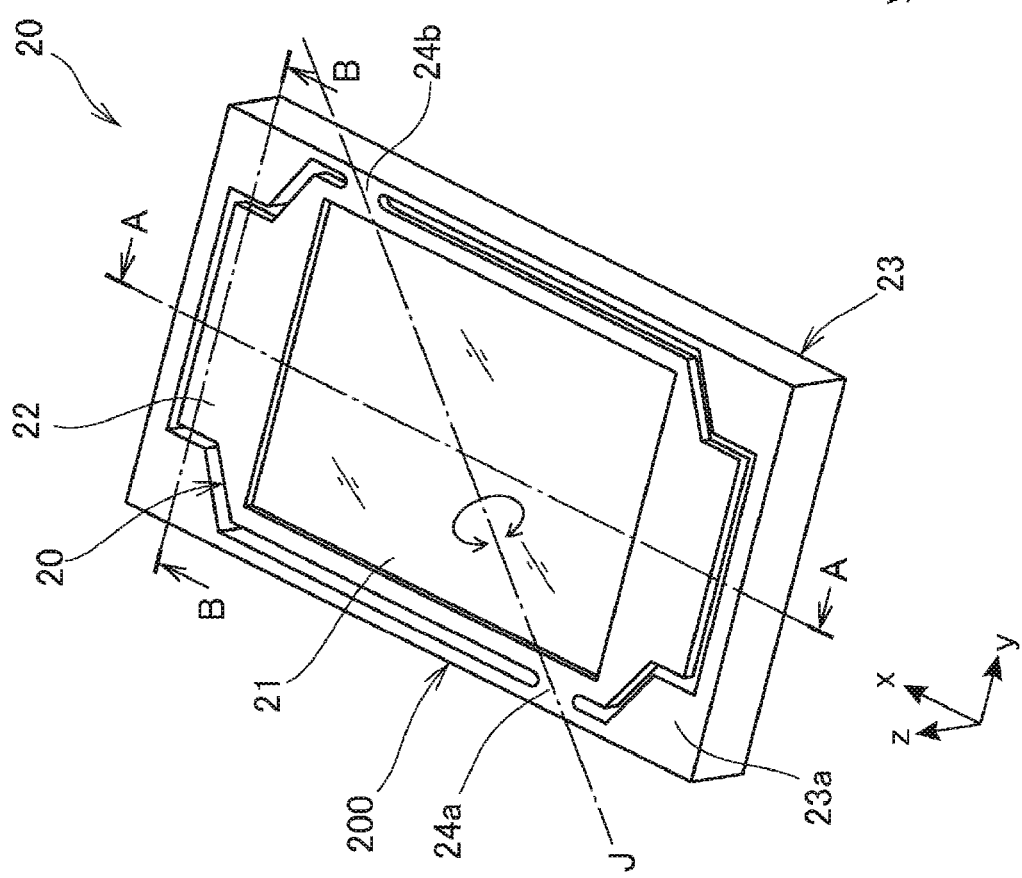
FIG. 4A
FIG. 4B

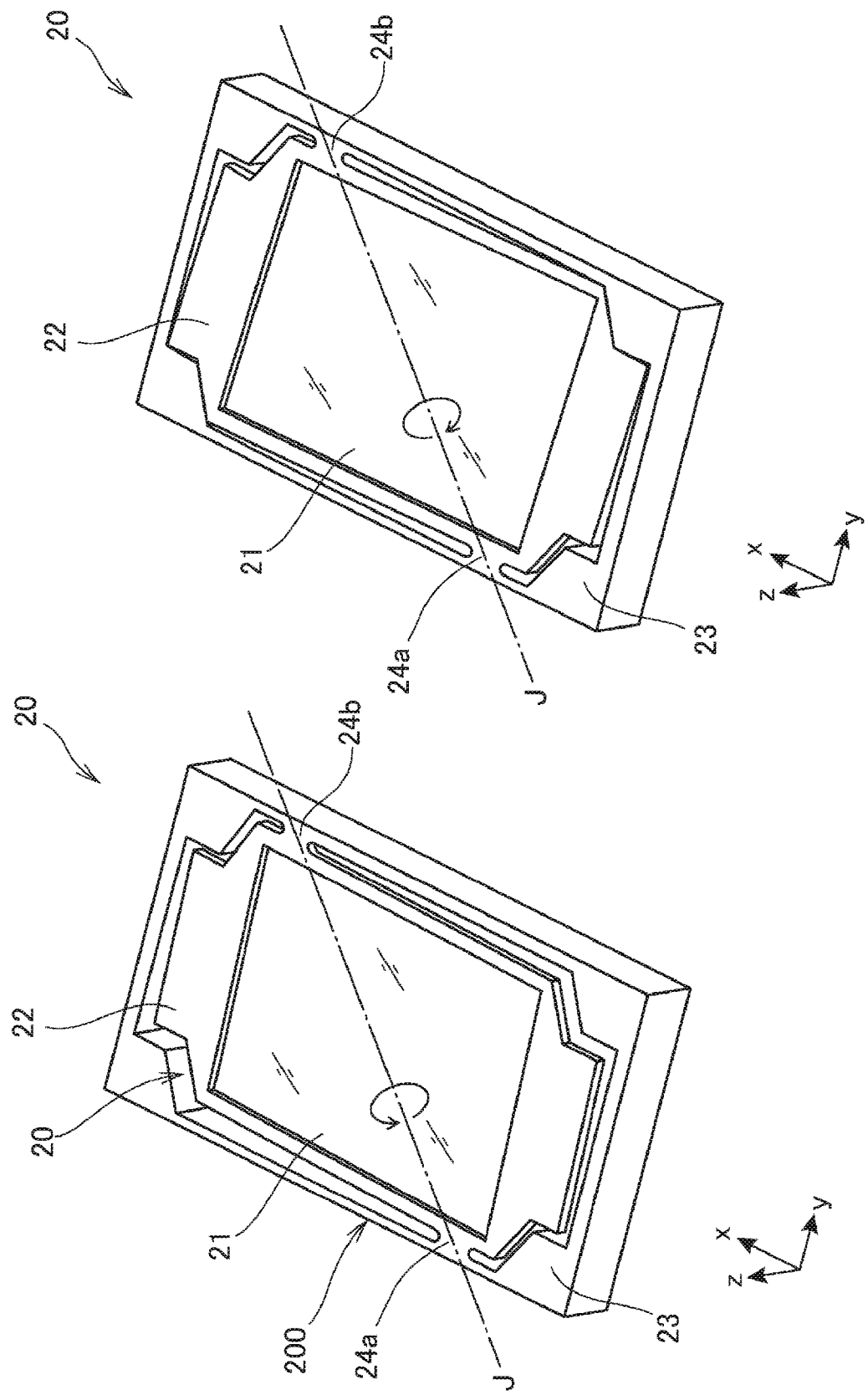

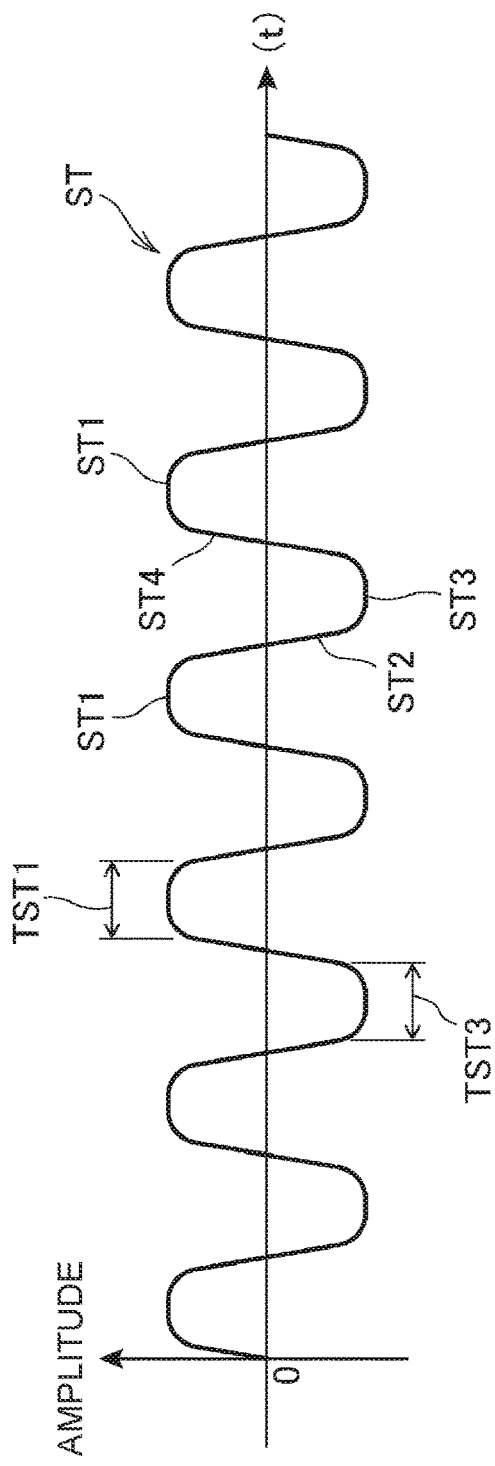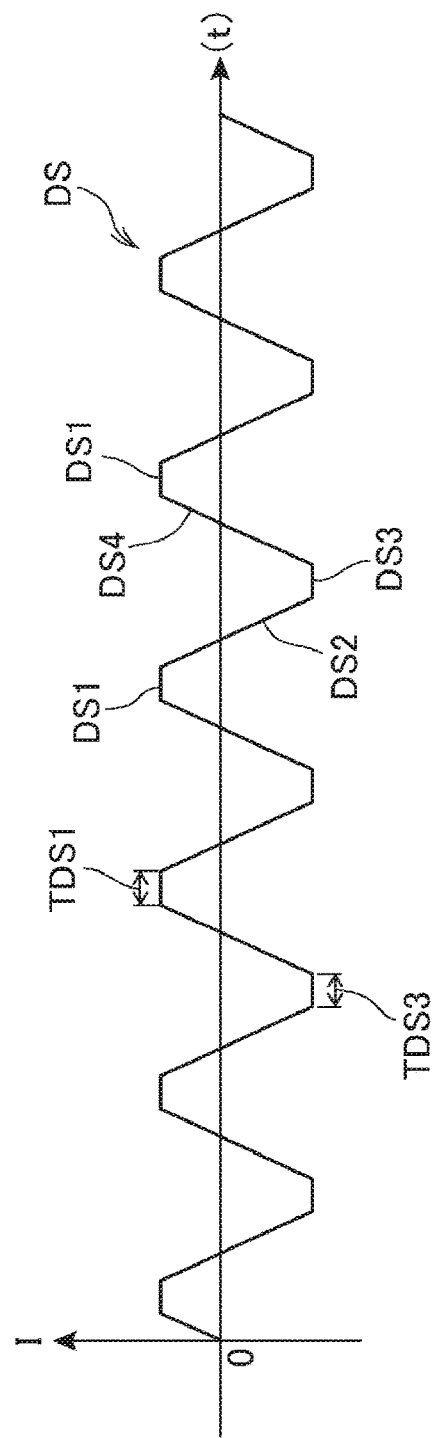

IMAGE DISPLAY DEVICE AND ADJUSTING DEVICE

CROSS-REFERENCE

The entire disclosure of Japanese Patent Application No. 2015-066411, filed Mar. 27, 2015 is expressly incorporated by reference herein.

BACKGROUND

1. Technical Field

The present invention relates to an image display device and an adjusting device.

2. Background Art

In the past, there has been known a projector refracting an optical path of the outgoing light to shift an image to thereby increase the pixels in a pseudo manner (see, e.g., JP-A-2011-158589).

In the conventional configuration, in order to control the shift amount of the image to ½ of one pixel, namely a half pixel, there is disposed a mechanical stopper for physically restricting the swing of an optical section such as glass for refracting the optical path of the outgoing light.

Instead of the method of disposing the mechanical stopper, a method of precisely adjusting the waveform of a drive signal for controlling the shift amount (the variation of the position of the image) is conceivable.

However, in the case in which the mechanical stopper is not used, even if the optical section is adjusted so as to shift the image with a predetermined shift amount (e.g., a half pixel), there is a possibility that the shift amount deviates from an initial value. For example, there is a possibility that the shift amount deviates from a half pixel due to a variation in attachment to a product. In that case, there arises a problem that it is difficult to readjust the shift amount.

SUMMARY

The present invention has been made in view of the circumstances described above, and has an object of providing an image display device and an adjusting device capable of varying the position of an image to achieve an increase in resolution, and at the same time, easily readjusting the variation.

In order to achieve the object described above, an image display device according to the invention is characterized by including a display section adapted to display an image, an image displacement section adapted to vary a position of the image displayed by the display section, and a control section adapted to control the image displacement section, wherein the control section is provided with two variable resistors each adapted to adjust amplitude of a drive signal adapted to control a variation of the position of the image due to the image displacement section, and a resistance value of one of the two variable resistors can be adjusted from outside of the image display device.

According to the invention, it is possible to vary the position of the image to thereby achieve an increase in resolution, and at the same time, easily readjust the variation.

Further, in the image display device described above, the invention is characterized in that the control section adjusts the resistance value of the one of the two variable resistors based on an operation from the outside of the image display device.

According to the invention, it becomes possible to easily adjust the resistance value of one of the two variable resistors via the control section.

Further, in the image display device described above, the invention is characterized in that a first variable resistor as the one of the two variable resistors is a digital potentiometer, and a second variable resistor as the other is a trimmer potentiometer.

According to the invention, by selectively using these potentiometers, the variation of the position of the image can flexibly be adjusted in accordance with a variety of situations such as a situation before assembly or a situation after assembly.

Further, in the image display device described above, the invention is characterized in that the two variable resistors are each a variable resistor adapted to adjust the variation of the position of the image due to the image displacement section to a defined value smaller than one pixel.

According to the invention, since the dedicated variable resistors are used, it becomes easy to adjust the variation in the position of the image to the defined amount.

Further, in the image display device described above, the invention is characterized in that the image displacement section includes an optical section having a plane of incidence of light where light emitted by the display section enters, a movable section adapted to hold the optical section, a support section adapted to swingably support the movable section, and an actuator driven by the drive signal and adapted to swing the movable section.

According to the invention, it is possible to obtain the image displacement section adapted to realize the variation in the position of the image corresponding to the defined amount to make a contribution to the increase in resolution.

Further, in the image display device described above, the invention is characterized in that a waveform of a trajectory of a predetermined part of the movable section when swinging, and a waveform of the drive signal supplied to the actuator for swinging the movable section are each a trapezoidal waveform.

According to the invention, it becomes easy to appropriately move the movable section to achieve the increase in resolution.

Further, in the image display device described above, the invention is characterized in that the optical section has a light transmissive property.

According to the invention, by changing the posture of the optical section, it is possible to easily vary the axis of the light transmitted through the optical section.

Further, in the image display device described above, the invention is characterized in that the actuator is an electromagnetically driven actuator.

According to the invention, it is possible to swing the movable section with sufficient power.

Further, in the image display device described above, the invention is characterized in that the actuator has a permanent magnet, and a coil adapted to generate a magnetic field acting on the permanent magnet, and at least one of the permanent magnet and the coil is provided to the movable section, and the other is disposed so as to be opposed to the one.

According to the invention, the configuration of the actuator is simplified.

Further, the invention relates to an adjusting device used for an image display device equipped with an image displacement section adapted to vary a position of an image to be displayed, and the adjusting device is characterized by including two variable resistors each adapted to adjust amplitude of a drive signal adapted to control a variation of the position of the image due to the image displacement section, wherein a resistance value of one of the two variable resistors can be adjusted from outside of the image display device.

According to the invention, it is possible to vary the position of the image to thereby achieve an increase in resolution, and at the same time, easily readjust the variation.

BRIEF DESCRIPTION OF THE DRAWINGS

FIGS. 4(a), 4(b) are diagrams of a vibratory device provided to the projector, wherein FIG. 4(a) is an upper surface perspective view, and FIG. 4(b) is a back surface perspective view.

FIGS. 5(a), 5(b) are cross-sectional views of the vibratory device 20 provided to the projector, wherein FIG. 5(a) is an A-A line cross-sectional view of FIG. 4(a), and FIG. 5(b) is a B-B line cross-sectional view of FIG. 4(b).

FIGS. 6(a), 6(b) are diagrams provided for the description of a movable section, wherein FIG. 6(a) shows the state in which the movable section has swung to one side, and FIG. 6(b) is a diagram showing the state in which the movable section has swung to the other side.

FIGS. 7(a), 7(b) are diagrams showing a relationship between a drive signal and a swing trajectory of the movable section, wherein FIG. 7(a) shows the drive signal, and FIG. 7(b) is a diagram showing the swing trajectory of the movable section.

DESCRIPTION OF EXEMPLARY EMBODIMENTS

Hereinafter, as an embodiment of an image display device, a projector for modulating the light emitted from a light source based on image information (an image signal), and then projecting the light (hereinafter referred to as "picture light") thus modulated to the outside to thereby display an image will be described with reference to the drawings.

The projector 1 described in the present embodiment is a display device for displaying a picture on a display surface based on a video signal input from an external video supply device not shown. As the video supply device, there can be cited, for example, a video reproduction device such as a DVD player, a broadcast reception device such as a digital television tuner, and a video output device such as a video game machine or a personal computer. Further, the video supply device can also be a communication device or the like for communicating with a personal computer and so on to receive video data.

Figure 1:
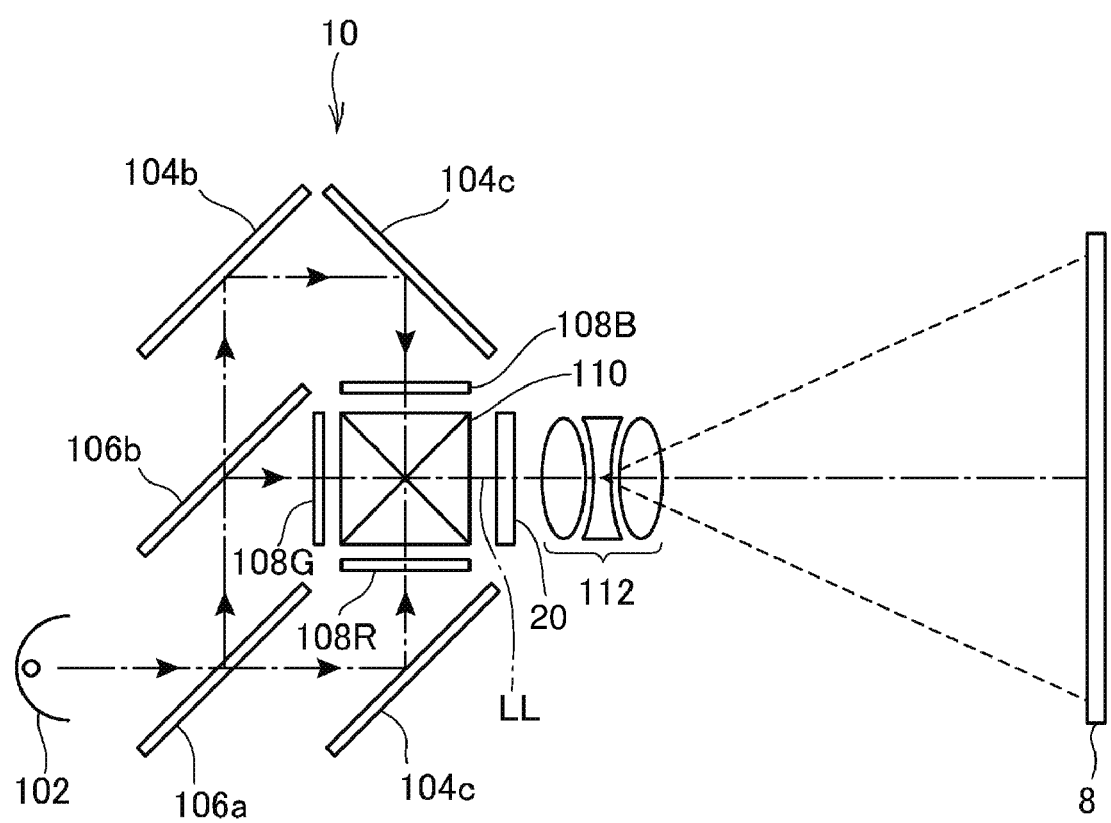
FIG. 1 is a diagram showing a configuration of a display section of a projector according to an embodiment.
Figure 2:
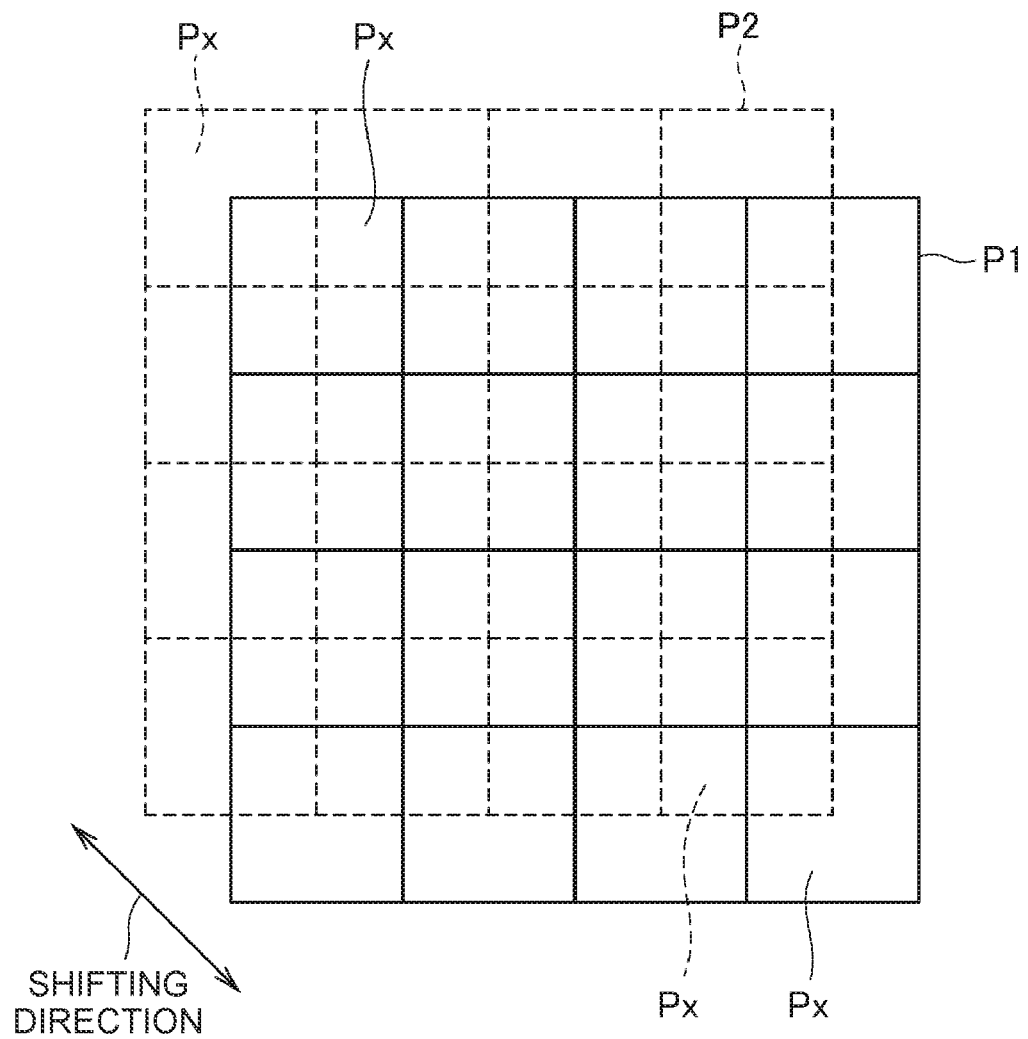
FIG. 2 is a diagram showing a condition in which picture light is shifted.
Figure 3:
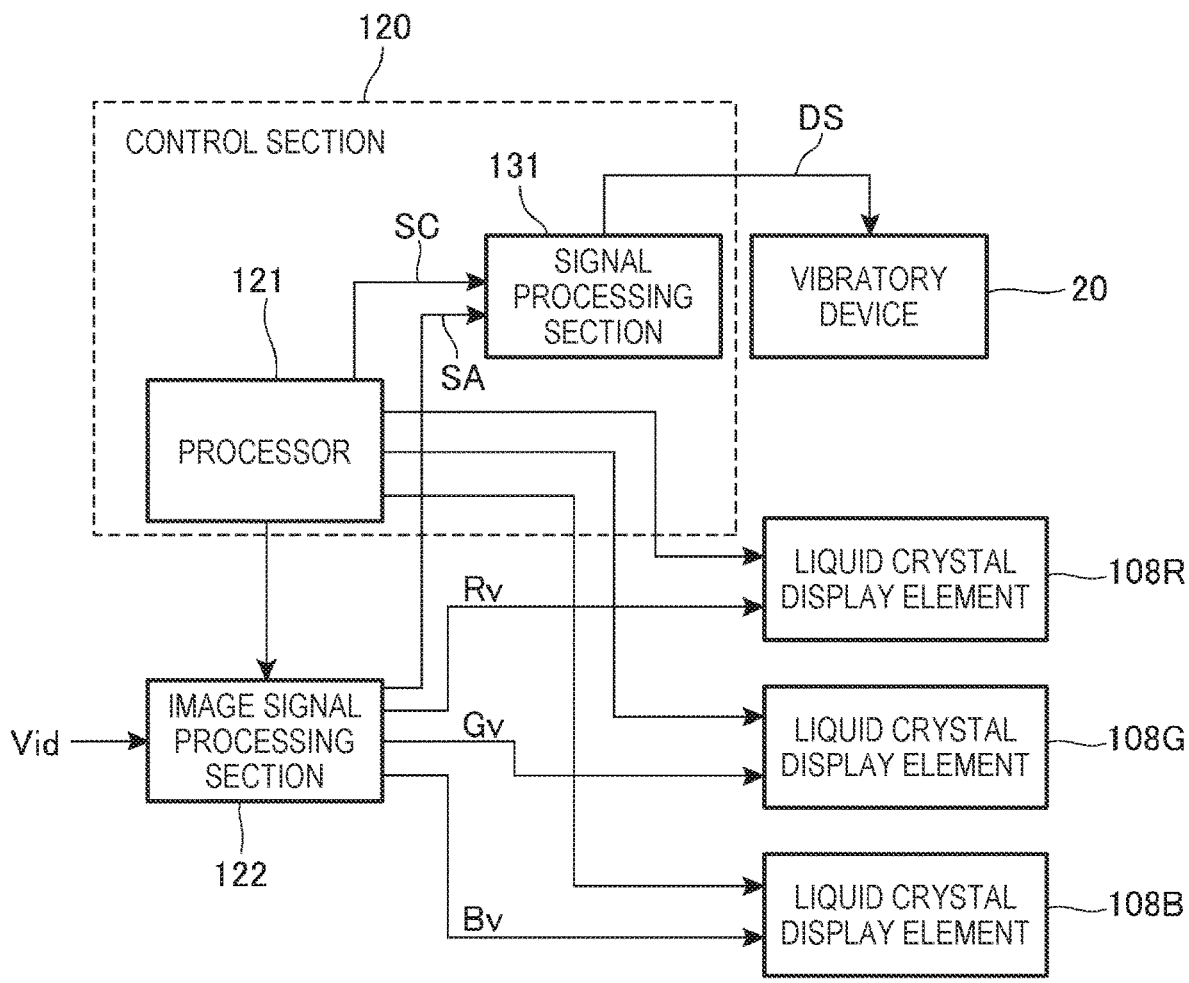
FIG. 3 is a block diagram showing an electrical configuration of the projector.
Figure 5A:
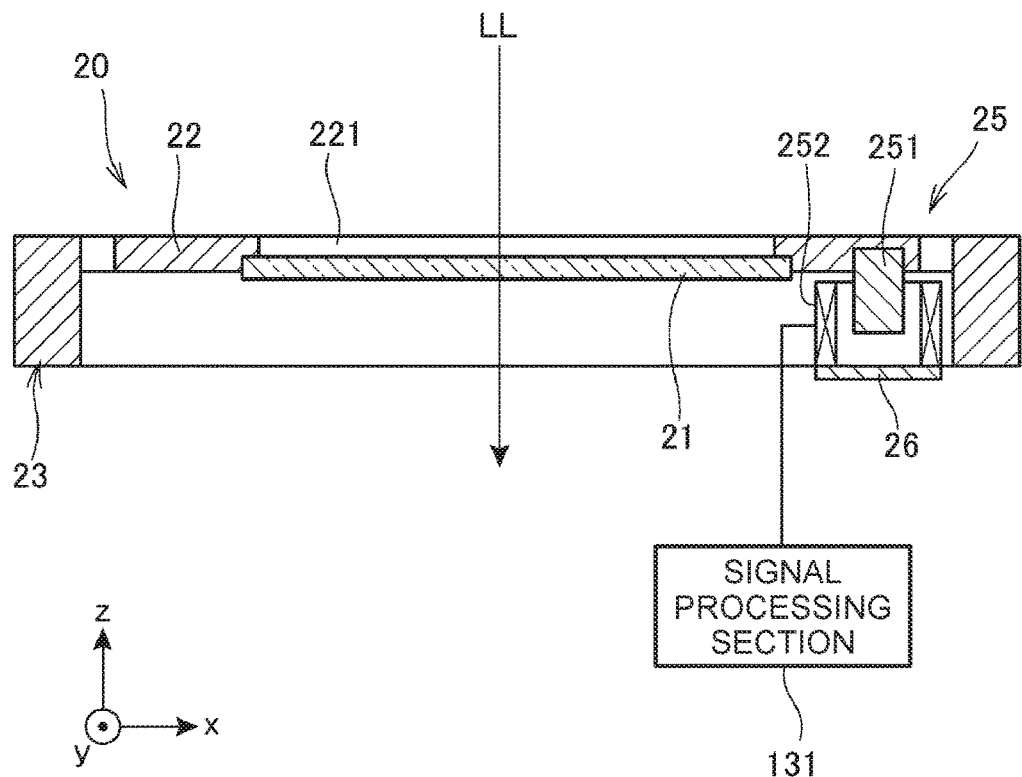
Figure 5B:
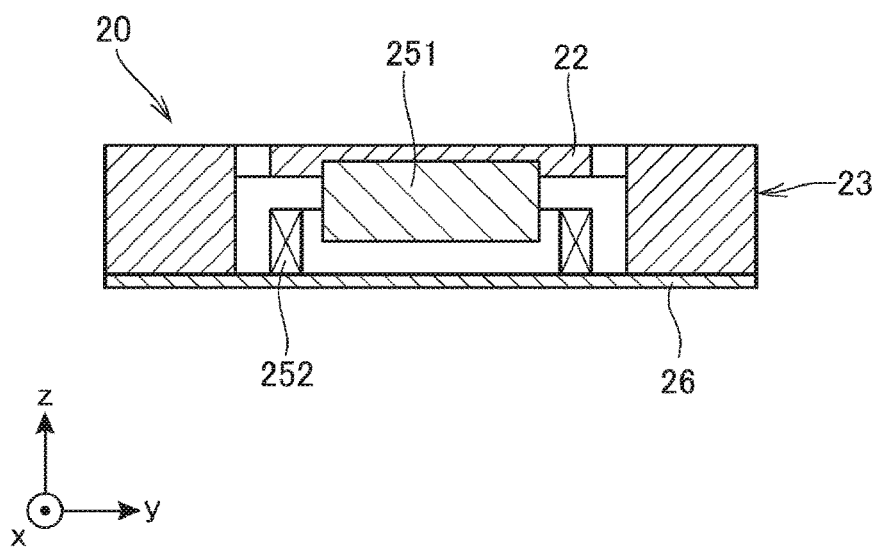

FIG. 1 is a diagram showing a configuration of a display section 10 of the projector 1. FIG. 2 is a diagram showing a condition in which picture light is shifted. FIG. 3 is a block diagram showing an electrical configuration of the projector 1. FIGS. 4(a), 4(b) are diagrams of a vibratory device 20 provided to the projector 1 shown in FIG. 1, wherein FIG. 4(a) is an upper surface perspective view, and FIG. 4(b) is a back surface perspective view. FIGS. 5(a), 5(b) are cross-sectional views of the vibratory device 20 provided to the projector 1 shown in FIG. 1, wherein FIG. 5(a) is an A-A line cross-sectional view of FIG. 4(a), and FIG. 5(b) is a B-B line cross-sectional view of FIG. 4(b).

It should be noted that, in FIGS. 4(a), 4(b), 5(a), 5(b), and so on, there are arbitrarily shown an x axis, a y axis, and a z axis as three axes perpendicular to each other, and the tip side of each of the arrows shown in the drawings is defined as "+ side," and the base end side is defined as "− side" for the sake of convenience of explanation. Further, hereinafter, a direction parallel to the x axis is also referred to as an "x-axis direction," a direction parallel to the y axis is also referred to as a "y-axis direction," a direction parallel to the z axis is also referred to as a "z-axis direction," and the +z side is also referred to as "top," and the −z side is also referred to as "bottom."

The projector 1 is a so-called "liquid crystal projector," and the display section 10 is provided with a configuration of projecting the picture light. Specifically, as shown in FIG. 1, the display section 10 is provided with a light source 102, mirrors 104a, 104b, and 104c, dichroic mirrors 106a, 106b, liquid crystal display elements 108R, 108G, and 108B, a dichroic prism 110, the vibratory device 20 functioning as an image shifting section, and a projection optical system 112.

As the light source 102, there can be cited, for example, a halogen lamp, a mercury lamp, a light emitting diode (LED), and a laser. Further, as the light source 102, there is used a light source for emitting white light. Then, the light emitted from the light source 102 is firstly separated by the dichroic mirror 106a into red light (R) and the rest of the light. The red light is reflected by the mirror 104a, then enters the liquid crystal display element 108R, and the rest of the light is further separated by the dichroic mirror 106b into green light (G) and blue light (B). Then, the green light enters the liquid crystal display element 108G, and the blue light is reflected by the mirrors 104b, 104c, and then enters the liquid crystal display element 108B.

The liquid crystal display elements 108R, 108G, and 108B are each used as a spatial light modulator. These liquid crystal display elements 108R, 108G, and 108B are transmissive spatial light modulators corresponding respectively to the primary colors of R, G, and B, and are each provided with pixels arranged in, for example, a 1080×1920 matrix. In each of the pixels, the light intensity of the transmitted light with respect to the incident light is controlled, and in each of the liquid crystal display elements 108R, 108G, and 108B, the light intensity distribution of all of the pixels is controlled in a coordinated manner. The light beams spatially modulated by such liquid crystal display elements 108R, 108G, and 108B are combined by the dichroic prism 110, and full-color picture light LL is emitted from the dichroic prism 110. Then, the picture light LL thus emitted is enlarged and projected on a screen 8 to be a display surface by the projection optical system 112.

The projection optical system 112 is an optical system for projecting the light, which is modulated by the liquid crystal display elements 108R, 108G, and 108B, on the screen 8. The projection optical system 112 is provided with at least one or more lenses. The projection optical system 112 can also be an optical system provided with at least one or more mirrors, or can also be an optical system provided with one or more lenses and one or more mirrors.

Here, the projector 1 has the vibratory device 20 disposed between the liquid crystal display elements 108R, 108G, and 108B and the projection optical system 112. In the present embodiment, the vibratory device 20 is disposed between the dichroic prism 110 and the projection optical system 112. This vibratory device 20 functions as an image displacement section (also referred to as an image shifting section) for shifting (performing so-called "pixel shifting" on) the light axis of the picture light LL. The vibratory device 20 displaces the position of the image, which is projected (displayed) on the screen 8 by the projector 1, in the direction roughly perpendicular to the projection direction of the projector 1. Thus, it becomes possible to project the image with the resolution (4K in the case in which the liquid crystal display elements 108R, 108G, and 108B are compliant with the full-HD standard) higher than the resolution of the liquid crystal display elements 108R, 108G, and 108B.

This principle will be described with reference to FIG. 2. The vibratory device 20 has a glass plate 21 (FIGS. 4(a), 4(b)) as the optical section having a plane of incidence of the light where the picture light enters. The vibratory device 20 is capable of shifting the light axis of the picture light LL transmitted through the glass plate 21 by changing the posture of the glass plate 21. The projector 1 makes the image display position (a first display position) P1 in the case of shifting the light axis of the picture light LL to one side, and the image display position (a second display position) P2 in the case of shifting the light axis of the picture light LL to the other side be shifted from each other in an oblique direction (the arrow direction in FIG. 2) as much as a half pixel (i.e., a half of the pixel Px) using the shift of the light axis of the picture light LL. In other words, the projector 1 moves the position where the image is displayed from the image display position P1 to the image display position P2, and at the same time moves the position from the image display position P2 to the image display position P1. Further, by alternately displaying the images at the image display positions P1, P2, the apparent pixels increases, and thus it is possible to achieve in increase in resolution of the image projected on the screen 8.

The projector 1 having the present configuration is provided with a control circuit 120 and an image signal processing section 122 in addition to the vibratory device 20 and the liquid crystal display elements 108R, 108G, and 108B as shown in FIG. 3. The control section 120 is a circuit for centrally controlling each section of the projector 1, and has a processor 121 and a signal processing section 131.

The processor 121 performs control of a writing operation of a data signal to the liquid crystal display elements 108R, 108G, and 108B, control of the signal processing section 131, a data signal generation operation to the image signal processing section 122, and so on. The signal processing section 131 is a circuit for inputting a sync signal SA output by the image processing section 122, then generating a drive signal DS of the vibratory device 20 based on the sync signal SA, and then outputting the drive signal DS to the vibratory device 20.

The image signal processing section 122 separates the image signal Vid supplied from the external video supply device by the three primary colors of R, G, and B, and at the same time converts the result into data signals Rv, Gv, and Bv suitable to the operations of the respective liquid crystal display elements 108R, 108G, and 108B. Then, the data signals Rv, Gv, and Bv thus obtained by the conversion are supplied respectively to the liquid crystal display elements 108R, 108G, and 108B, and the liquid crystal display elements 108R, 108G, and 108B operate based on the data signals Rv, Gv, and Bv, respectively.

It should be noted that the control section 120 and the image signal processing section 122 are constituted by one substrate or a plurality of substrates having a variety of electric components such as ICs mounted thereon.

Then, the vibratory device 20 incorporated in the projector 1 will be described.

As shown in FIG. 4(a), FIG. 4(b), FIG. 5(a), and FIG. 5(b), the vibratory device 20 has the glass plate 21 having a light transmissive property and for deflecting the picture light LL, a movable section 22 for holding the glass plate 21, a support section 23 for swingably supporting the movable section 22, and a drive mechanism (an actuator) 25 for swinging the movable section 22 with respect to the support section 23.

The vibratory device 20 is disposed inside the projector 1 so that, for example, the +z side faces to the dichroic prism 110 side and the −z side faces to the projection optical system 112 side.

The glass plate 21 has a roughly rectangular planar-view shape, and is disposed so that the longitudinal direction thereof is roughly parallel to the x-axis direction. The glass plate 21 can transmit the picture light LL, which has entered the glass plate 21, while refracting the picture light LL by changing the posture of the glass plate 21, namely by varying the incident angle of the picture light LL. Therefore, by changing the posture of the glass plate 21 so as to achieve the target incident angle, the deflection direction and the deflection amount of the picture light LL can be controlled. The size of the glass plate 21 is appropriately set so as to be able to transmit the picture light LL emitted from the dichroic prism 110. Further, it is preferable for the glass plate 21 to substantially be colorless and transparent. Further, an antireflection film can be formed on the plane of incidence and the exit surface of the picture light LL of the glass plate 21.

It should be noted that the constituent material of the glass plate 21 is not particularly limited, but there can be used a variety of glass materials such as super white glass, borosilicate glass, or quartz glass. Further, although in the present embodiment, the glass plate 21 is used as the optical section, the optical section is not particularly limited providing the optical section is formed of a material having a light transmissive property, and can also be formed of a variety of crystalline materials such as quartz crystal or sapphire, a variety of resin materials such as polycarbonate resin or acrylic resin, or the like. It should be noted that it is preferable to use the glass plate 21 as the optical section as in the present embodiment, and thus, the rigidity of the glass plate 21 can particularly be increased, and therefore, the deflection variation of the light deflected by the glass plate 21 can particularly be suppressed.

The movable section 22 has a plate-like shape, and has a through hole 221 disposed in a central part of the movable section 22. Further, the glass plate 21 is fitted in the through hole 221, and the glass plate 21 is bonded to the movable section 22 with, for example, an adhesive. It should be noted that the through hole 221 has a step on the circumferential surface of the through hole 221, and receives the glass plate 21 with the step. Thus, it becomes easy to dispose the glass plate 21 on the movable section 22.

The support section 23 is provided with a frame section 23a having a rectangular shape surrounding the periphery of the movable section 22, and a pair of shaft sections 24a, 24b for connecting the movable section 22 and the frame section 23a to each other respectively at a pair of corner sections opposed to each other of the glass plate 21 having a rectangular shape. Thus, the support section 23 is capable of swingably supporting the movable section 22 with reference to a swing axis J connecting the pair of shaft sections 24a, 24b to each other.

The shaft sections 24a, 24b are formed at respective positions shifted in the x-axis direction and the y-axis direction in a planar view, and the swing axis J is set to an axis roughly 45° tilted with respect to both of the x axis and the y axis. Therefore, it is possible to swing the movable section 22 so as to uniformly shift the deflection direction of the picture light LL due to the glass plate 21 held by the movable section 22 with respect to both of the x-axis direction and the y-axis direction. Further, in the vibratory device 20, since the shaft sections 24a, 24b are disposed point-symmetrically about the center of the glass plate 21 in the planar view, good swing balance of the movable section 22 (the glass plate 21) is achieved.

The movable section 22, the support section 23, and the shaft sections 24a, 24b described hereinabove are formed integrally. Thus, it becomes easy to increase the impact resistance and the long-term durability in the boundary part between the support section 23 and the shaft sections 24a, 24b and the boundary part between the shaft sections 24a, 24b and the movable section 22.

Further, the movable section 22, the support section 23, and the shaft sections 24a, 24b are formed of a material lower in Young modulus than the constituent material of the glass plate 21. As the constituent material of these sections, it is preferable to include resin, and further preferable to consist primarily of resin. Thus, it is possible to efficiently inhibit the stress generated due to the swing of the movable section 22 from leading to an unwanted vibration of the glass plate 21 itself.

Further, since the side surfaces of the glass plate 21 is surrounded by the movable section 22 relatively low in Young modulus, it is possible to suppress the stress caused in the glass plate 21 to a low level when changing the posture of the glass plate 21 to suppress an unwanted vibration generated in the glass plate 21 due to the stress distribution to a low level. As a result, it is possible to prevent the image having been deflected by the glass plate 21 from being deflected toward an unintended direction. Further, it is possible to suppress the variation in the swing trajectory ST (FIG. 7(b) described later) of the movable section 22 with respect to the ambient temperature.

Such resin is not particularly limited, and there can be cited, for example, polyethylene, polypropylene, silicone, polyacetal, polyamide, polycarbonate, polyphenylene ether, polyethylene terephthalate, polybutylene terephthalate, polyarylate, polysulfone, polyether sulfone, polyphenylene sulfide, polyether ether ketone, polyimide, polyetherimide, and fluorine resin. Further, there is used resin including at least one of these materials.

Then, the drive mechanism 25 for swinging the movable section 22 will be described.

The drive mechanism 25 has a permanent magnet 251 and a coil 252, and is formed as an electromagnetic actuator for making a drive signal DS, which is an alternating current output from the signal processing section 131, flow through the coil 252 to thereby generate electromagnetic force. By using the electromagnetic actuator as the drive mechanism 25, it is possible to generate sufficient force for swinging the movable section 22, and therefore, it is possible to smoothly swing the movable section 22.

The permanent magnet 251 is disposed in an edge part of the movable section 22, and has an elongated shape along the y-axis direction. Further, the permanent magnet 251 is magnetized in the z-axis direction (the thickness direction of the movable section 22). The type of the permanent magnet 251 is not particularly limited, and there can be used, for example, a neodymium magnet, a ferrite magnet, a samarium-cobalt magnet, and an alnico magnet.

The coil 252 is fixed to the support section 23 via a holding member 26 so as to be opposed to the permanent magnet 251 in the z-axis direction. Further, the coil 252 is a cylindrical air core coil, and a part of the permanent magnet 251 is inserted in the coil 252. Thus, it is possible to make the magnetic field generated by the coil 252 efficiently act on the permanent magnet.

Further, it is possible to achieve low-profiling of the vibratory device 20. It should be noted that the permanent magnet 251 and the coil 252 can also be disposed via a predetermined gap, and in this case, it is also possible for the coil 252 to have the wire wound in the vicinity of the center thereof.

It should be noted that the arrangement of the coil 252 is not particularly limited within a range in which the magnetic field can act on the permanent magnet 251. Further, although in the present embodiment, there is adopted a so-called "moving magnet type" drive mechanism 25 having the permanent magnet 251 provided to the movable section 22, the arrangement of the permanent magnet 251 and the coil 252 can also be reversed.

Specifically, there can be adopted a so-called "moving coil type" drive mechanism 25 having the coil 252 provided to the movable section 22. It should be noted that by adopting the "moving magnet type" drive mechanism 25 as in the present embodiment, it is hard for the heat of the coil 252 generated by supplying the power to propagate to the movable section 22 and the glass plate 21, and thus, the variation in vibration characteristic (the variation in resonant frequency), the deflection of the glass plate 21, and so on due to the heat can effectively be suppressed.

Here, FIG. 6(a) shows the state in which the movable section 22 has swung to one side, and FIG. 6(b) shows the state in which the movable section 22 has swung to the other side.

The drive mechanism 25 having the present configuration swings the movable section 22 in the following manner. In the case in which the drive signal DS does not flow from the signal processing section 131 to the coil 252, the movable section 22 remains substantially parallel to the x-y plane. Then, when the drive signal DS is supplied from the signal processing section 131 to the coil 252, the movable section 22 swings (rotates) around the swing axis J with respect to the support section 23 so as to repeat the state shown in FIG. 6(a) and the state shown in FIG. 6(b). Then, due to such a swing of the movable section 22, the light axis of the picture light LL is shifted as shown in FIG. 2, and the images are alternately displayed at the image display positions P1, P2. Therefore, the apparent pixels increase to achieve an increase in resolution of the image.

Next, the drive signal DS supplied to the coil 252 and the swing trajectory ST of the movable section 22 when making the drive signal DS flow through the coil 252 will be described. It should be noted that the swing trajectory ST of the movable section 22 is the amplitude of a predetermined part (a part distant from the swing axis J) of the movable section 22 when swinging recorded on the time axis, and is measured using a laser displacement gauge.

FIGS. 7(a), 7(b) are diagrams showing a relationship between the drive signal DS and the swing trajectory ST of the movable section 22, wherein FIG. 7(a) shows the drive signal DS, and FIG. 7(b) is a diagram showing the swing trajectory ST of the movable section 22. It should be noted that in FIGS. 7(a), 7(b), the horizontal axis represents the elapsed time (t), the vertical axis of the drive signal DS represents the current value (I), and the vertical axis of the swing trajectory ST represents the amplitude amount.

In order to vibrate the vibratory device 20, it is necessary to supply the coil 252 with the drive signal DS having a trapezoidal shape. Further, since the displacement amount of the vibratory device 20 is proportional to the current of the drive signal DS, it is necessary to make the drive current flow so that the displacement amount becomes appropriate.

Therefore, as shown in FIG. 7(b), the drive signal DS has a waveform having a period constituted by a flat part DS1 located on the (+) side and having a current value kept roughly constant, a flat part DS3 located on the (−) side and having a current value kept roughly constant, a gradually-decreasing part DS2 connecting the end of the flat part DS1 and the start of the flat part DS3 and having a current value continuously and gradually decreasing, and a gradually-increasing part DS4 connecting the end of the flat part DS3 and the start of the flat part DS1 and having a current value continuously and gradually increasing. Thus, as shown in FIG. 7(b), it is possible to control the swing trajectory ST of the movable section 22 to have the trapezoidal shape.

It should be noted that the frequency of the drive signal DS is different by the frame rate (the number of pixels per second) of the projector 1, but can be set to, for example, 60 Hz in the case in which the frame rate is 120 fps. Thus, it is possible to display the continuing images (the picture light LL corresponding to one frame) alternately at the image display positions P1, P2, and thus, it is possible to more reliably exert the effect of the pixel shifting described above.

Figure 8:
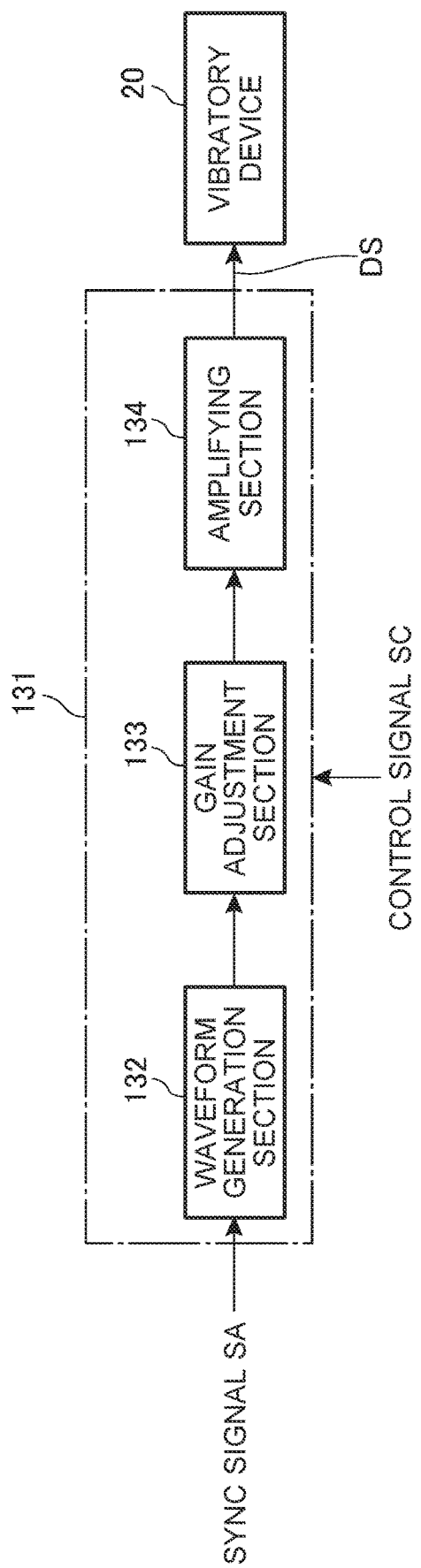
FIG. 8 is a functional block diagram of a signal processing section.

FIG. 8 is a functional block diagram of the signal processing section 131.

The signal processing section 131 is provided with a waveform generation section 132, a gain adjustment section 133, and an amplifying section 134, and performs the generation of the drive signal DS and the waveform adjustment of the drive signal DS with these sections. It should be noted that the signal processing section 131 is constituted by mounting a variety of electric components such as ICs on a substrate the same as or different from the substrate constituting at least either one of the control section 120 and the image signal processing section 122.

The waveform generation section 132 inputs the sync signal SA having a rectangular shape, and generates a signal of a trapezoidal wave to be the reference signal of the drive signal DS. Here, the waveform generation section 132 is provided with a function of controlling the gradient of the trapezoidal wave, namely a function of controlling the gradient of the gradually-decreasing part DS2 and the gradually-increasing part DS4 shown in FIG. 7(a), and controls the gradient of the trapezoidal wave based on the control (e.g., input of a parameter from the processor 121) by the processor 121, or manual control of a variable element (e.g., a variable resistor). By controlling the gradient of the trapezoidal wave, durations TDS1, TDS2 of the flat parts DS1, DS2 of the drive signal DS can also be controlled.

It should be noted that in the present configuration, as shown in FIG. 7(a) and FIG. 7(b), the duration TDS1 of the flat part DS1 of the drive signal DS is shorter than a duration TST1 of a flat part ST1 of the swing trajectory ST of the movable section 22, and similarly, the duration TDS3 of the flat part DS3 of the drive signal DS is shorter than a duration TST3 of a flat part ST3 of the swing trajectory ST of the movable section 22. By fulfilling such relationships, the time proportion (time occupancy) of each of the flat parts ST1, ST3 to one period can be made higher, and it is possible to exert excellent image display characteristics. Further, since it is possible to more easily make the waveform of the swing trajectory ST correspond to the waveform of the drive signal DS, the posture control of the movable section 22 becomes easy, and further, the unwanted vibration of the movable section 22 can be reduced.

The gain adjustment section 133 adjusts the gain of the amplifying section 134 in a posterior stage. The amplifying section 134 amplifies the signal of the trapezoidal wave generated with the gain adjusted by the gain adjustment section 133, and then supplies the result to the vibratory device 20 as the drive signal DS. Since the vibratory device 20 has a predetermined impedance, the current flows in accordance with the signal amplified by the amplifying section 134, and the vibratory device 20 vibrates in sync with the sync signal SA. By adjusting the gain, it is possible to adjust the amplitude of the drive signal DS, and in other words, it is possible to adjust the amplitude of the vibratory device 20.

Figure 9:
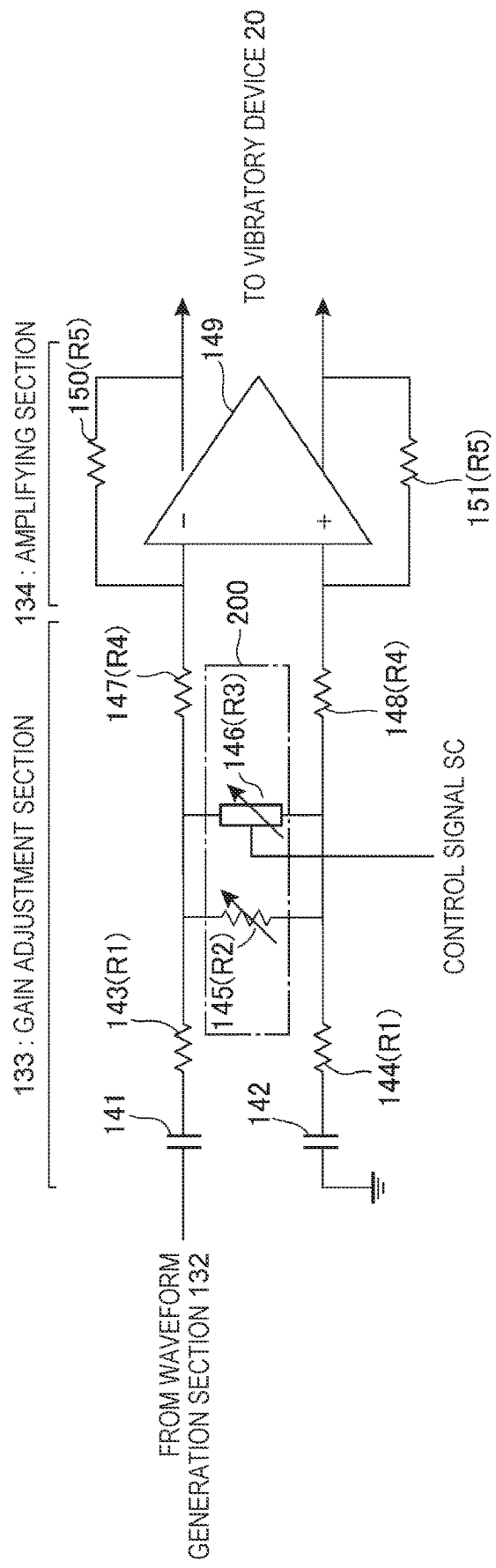
FIG. 9 is a circuit diagram of a gain adjustment section and an amplifying section.

FIG. 9 is a circuit diagram of the gain adjustment section 133 and the amplifying section 134.

The gain adjustment section 133 is provided with capacitors 141, 142, resistors 143, 144 on the anterior stage side, a trimmer potentiometer (a second variable resistor) 145, a digital potentiometer (a first variable resistor) 146, and resistors 147, 148 on the posterior stage side. The amplifying section 134 is provided with an amplifier 149 and feedback resistors 150, 151.

As shown in FIG. 9, since the trimmer potentiometer 145 and the digital potentiometer 146 are connected in parallel to each other, the gain G1 from the gain adjustment section 133 to the amplifying section 134 is expressed as Formula (1) below.

[Formula (1)]

$$G1 = \frac{-2 * \frac{R2 * R3}{R2 + R3} * R5}{2 * R1 * R4 + (R1 + R4) * \frac{R2 * R3}{R2 + R3}} \quad (1)$$

Here, the resistance values R1 through R5 in Formula (1) are as described in parentheses in FIG. 9. Specifically, the value R1 is the resistance value of the resistors 143, 144, the value R2 is the resistance value of the trimmer potentiometer 145, the value R3 is the resistance value of the digital potentiometer 146, the value R4 is the resistance value of the resistors 147, 148, and the value R5 is the resistance value of the feedback resistors 150, 151.

As shown in Formula (1), since the gain G1 is the combined resistance in the gain adjustment section 133, by varying the resistance value R2 of the trimmer potentiometer 145 and the resistance value R3 of the digital potentiometer 146, it is possible to vary the gain G1. Thus, it is possible to adjust the amplitude of the vibratory device 20.

In other words, the trimmer potentiometer 145 and the digital potentiometer 146 function as an adjusting device 200 for adjusting the gain G1 (corresponding to the amplitude of the vibratory device 20) of the amplifying section 134.

The trimmer potentiometer 145 is a resistor the resistance value of which can be varied by a physical measure. The trimmer potentiometer 145 of the present embodiment is a variable resistor also called a semi-fixed resistor, and is provided with a rotator for varying the resistance value R2, and it is possible to rotate the rotator using a tool such as a screw driver. Therefore, if the operator is capable of accessing the trimmer potentiometer 145, it is possible to easily adjust the resistance value R2 using the tool. It should be noted that since it is necessary to perform the operation with a physical measure in order to vary the resistance value R2 of the trimmer potentiometer 145, it is not possible to adjust the resistance value R2 thereof from the outside of the projector 1 after the trimmer potentiometer 145 is attached to the inside of the projector 1.

It should be noted that besides the rotary type provided with the rotator, it is possible to apply a variety of trimmer potentiometers within a range in which an operation section for varying the resistance value R2 with a physical measure is provided.

The digital potentiometer 146 is a resistor the resistance value of which can be varied by an electronic measure. The digital potentiometer 146 of the present embodiment is a variable resistor capable of varying the resistance value R3 by a control signal SC (see FIG. 3 and FIG. 8), and it is possible to control the digital potentiometer 146 from the processor 121 to vary the resistance value R3. Therefore, it is possible to easily adjust the resistance value R3 of the digital potentiometer 146 from the outside via the processor 121.

More specifically, a method in which the user (e.g., the operator) operates an operation panel not shown provided to the projector 1, a method of connecting external equipment to the projector 1 to remotely control the projector 1 from the external equipment, or the like is possible. Due to these methods or the like, it is possible to adjust the resistance value R3 of the digital potentiometer 146 from the outside of the projector 1.

Incidentally, since the vibratory device 20 of the present configuration is not a configuration using a conventional mechanical stopper, it is necessary to adjust the gain G1 in order to adjust the amplitude of the vibratory device 20. However, in the case in which the vibratory device 20 is attached to the inside of the projector 1 after adjusting the gain G1, there is a possibility that the amplitude of the vibratory device 20 becomes misaligned and the shift amount of the image is deviated from the half pixel due to the variation in attachment.

Therefore, in the present configuration, a unit adjustment of the vibratory device 20 is performed before the attachment to the projector 1, and then, the adjustment as the product (the projector 1) is performed after the attachment.

(Unit Adjustment Process)

The swing trajectory ST of the vibratory device 20 is measured using a measurement device such as a laser displacement gauge. Then, the adjustment is performed so that the amplitude of the swing corresponds to the shift amount of the half pixel. The adjustment at this moment is performed by attaching the vibratory device 20 to a predetermined jig, and the operator adjusting the trimmer potentiometer 145. Therefore, it is sufficient for the circuit to be provided with the power supply to the drive system of the vibratory device 20 and the sync signal SA, and further, the facility is simpler than in the case of perform the adjustment via the processor 121, and the adjustment can more promptly be performed.

(Adjustment Process As Product)

After assembling the projector 1 including the vibratory device 20, in the case in which a fine adjustment is necessary, it is performed by adjusting the digital potentiometer 146 via the processor 121. The present adjustment is performed in, for example, the inspection before shipment of the product, or when a repair request arises after shipment of the product. In the present adjustment, there is no need to open the case (also referred to as an exterior component) not shown of the projector 1, and it is possible for the operator to perform the fine adjustment while monitoring the projection image.

Since there is no need to open the case as described above, if comparing to the method of opening the case to adjust the internal trimmer potentiometer 145, the adjustment is easier. In addition, it is also possible to avoid the situation that the amplitude of the vibratory device 20 is deviated due to the influence of opening and closing of the case.

It should be noted that it is sufficient for the adjustment sensitivity and the adjustment width of the trimmer potentiometer 145 and the digital potentiometer 146 to arbitrarily be set. For example, it is also possible to configure the trimmer potentiometer 145 used in the unit adjustment process as a variable resistor for performing a relatively coarse adjustment, and to configure the digital potentiometer 146 as a variable resistor for performing a relatively fine adjustment. In other words, it is also possible for the trimmer potentiometer 145 to be a variable resistor for performing a coarser adjustment than in the digital potentiometer 146. In this case, it becomes easy to simplify the unit adjustment process.

As described hereinabove, since the projector 1 to which the invention is applied is provided with the vibratory device functioning as the image displacement section, it is possible to achieve the increase in resolution by varying the position of the projection image. Further, there are provided the trimmer potentiometer 145 and the digital potentiometer 146 as the two variable resistors for adjusting the amplitude of the drive signal DS for controlling the shift amount (the variation between the positions of the images) of the vibratory device 20. Since the resistance value R3 of the digital potentiometer 146 as one of the variable resistors can be adjusted from the outside of the projector 1, it is possible to easily readjust the shift amount of the vibratory device 20.

According to these, it is possible to vary the positions of the projection images to achieve the increase in resolution, and at the same time, it becomes possible to provide the projector 1 capable of easily readjusting the shift amount.

Further, since the processor 121 adjust the resistance value R3 of the digital potentiometer 146 as one of the variable resistors based on the operation from the outside of the projector 1, it is possible to easily adjust the resistance value R3 of the digital potentiometer 146 via the processor 121.

Further, one of the variable resistors is the digital potentiometer (the first variable resistor) 146, and the other of the variable resistors is the trimmer potentiometer (the second variable resistor) 145. Therefore, by selectively using these potentiometers 146, 145, the shift amount can flexibly be adjusted in accordance with a variety of situations. Specifically, in the state in which the projector 1 has been assembled, the shift amount can easily be adjusted using the digital potentiometer 146, and before the assembly or in a decomposed state, the shift amount can easily be adjusted using the trimmer potentiometer 145. Further, it is also possible for the operator to arbitrarily select which one of the potentiometers 145, 146 is to be used.

Further, the trimmer potentiometer 145 and the digital potentiometer 146 are the variable resistors for adjusting the shift amount of the vibratory device 20 to the defined amount corresponding to the half pixel. Since the dedicated variable resistors are used, it becomes easy to adjust the shift amount to the half pixel as the defined amount.

Further, the vibratory device 20 has the glass plate 21 functioning as the optical section having a plane of incidence of light where the light emitted by the display section 10 enters, the movable section 22 for holding the glass plate 21, the support section 23 for swingably supporting the movable section 22, and the drive mechanism 25 functioning as the actuator driven by the drive signal DS and for swinging the movable section 22. Thus, it is possible to obtain the vibratory device 20 realizing the shift amount corresponding to the defined amount (the half pixel) to make a contribution to the increase in resolution.

Further, since the glass plate 21 has a light transmissive property, by varying the posture of the glass plate 21, it is possible to easily vary the axis of the light transmitted through the glass plate 21.

Further, the drive mechanism 25 is electromagnetically driven, and can therefore swing the movable section 22 with sufficient power.

Further, the drive mechanism. 25 has the permanent magnet 251, and the coil 252 for generating the magnetic field acting on the permanent magnet 251, and one of the permanent magnet 251 and the coil 252 is provided to the movable section 22, and the other is disposed so as to be opposed to the one. Thus, the configuration of the actuator is simplified.

Further, since the waveform of the trajectory of the predetermined part of the movable section 22 when swinging, and the waveform of the drive signal DS to be supplied to the drive mechanism 25 for swinging the movable section 22 are each a trapezoidal waveform, it becomes easy to appropriately move the movable section 22 to achieve the increase in resolution. Moreover, due to the gain adjustment for regulating the amplitude of the trapezoidal waveform, the amount of the amplitude can easily be adjusted. Therefore, it is sufficient to configure the circuit for performing the gain adjustment with the two variable resistors (the trimmer potentiometer 145 and the digital potentiometer 146) described above, and a simple circuit configuration can be applied.

Further, although in the present embodiment, there is shown the case of connecting the trimmer potentiometer 145 and the digital potentiometer 146 in parallel to each other, a configuration of connecting them in series to each other is also possible.

It should be noted that the embodiment described above is not a limitation, but it is possible to implement the embodiment added with a variety of modifications or improvements. Some modified examples will be described below.

For example, although in the embodiment described above, there is described the case in which the shift amount of the vibratory device 20 is set to the amount corresponding to the half pixel to achieve the increase in resolution, the shift amount is not limited to the half pixel. If the shift amount between the image display positions P1, P2 shown in FIG. 2 is set to a defined value smaller than one pixel, it is possible to increase the apparent pixels to achieve the increase in resolution. For example, the shift amount can be set to a quarter of a pixel, or can also be set to an eighth of a pixel.

Further, although in the embodiment described above, there is described the case of using the trimmer potentiometer 145, it is also possible to use a variable resistor other than the trimmer potentiometer providing the variable resistor is one (the second variable resistor) capable of being used in the unit adjustment process. Further, although in the embodiment described above, there is described the case of using the digital potentiometer 146, it is also possible to use a variable resistor other than the digital potentiometer providing the variable resistor is one (the first variable resistor) capable of being adjusted from the outside. Further, it is also possible to use an amplifier capable of adjusting the gain with the processor 121 instead of using the digital potentiometer 146. Also in this case, it is possible to adjust the gain from the outside of the projector 1 by the control from the processor 121.

Further, although in the embodiment described above, there is described the case of using the vibratory device 20 as the image displacement section, it is possible to use a constituent other than the vibratory device 20. Further, although there is described the case of using the glass plate 21 as the optical section having the plane of incidence of light where the picture light enters, the optical section is not limited to the glass plate 21, but can also be a mirror having a light reflective property. In such a case, it becomes possible to use an optical device according to the invention as an optical device for light scanning, an optical switch, an optical attenuator, and so on.

Further, although in the embodiment described above, there is described the case of constituting the adjusting device 200 for adjusting the gain G1 (corresponding to the amplitude of the vibratory device 20) of the amplifying section 134 by the trimmer potentiometer 145 and the digital potentiometer 146, this is not a limitation, and it is also possible to arrange that other electrical components are provided. In essence, it is sufficient for the adjusting device 200 to include the trimmer potentiometer 145 and the digital potentiometer 146, and it is also possible to adopt the signal processing section 131 as the adjusting device 200. Further, it is also possible to adopt a configuration in which the adjusting device 200 can independently be attached to and detached from the projector 1, and is distributed as a unit.

Further, in the embodiment described above, there can also be two or more trimmer potentiometers 145 and two or more digital potentiometers 146.

Further, although in the embodiment described above, there is described the liquid crystal projector as the image display device, a light scanning type projector using an optical device for light scanning is also possible. Further, although in the embodiment described above, the explanation is presented citing the configuration, in which the transmissive liquid crystal display element is used as the spatial light modulator, as an example, it is also possible for the spatial light modulator to have a configuration of using a reflective type liquid crystal display element such as LCOS (registered trademark) (liquid crystal on silicon), a digital micromirror device (DMD), or the like. Further, the image display device is not limited to the projector, but can also be applied to a printer, a scanner, a head-mounted display (HMD), a head-up display (HUD), and so on besides the projector.

It should be noted that the projector 1 can have a configuration of being provided with the digital potentiometer 146 alone out of the trimmer potentiometer 145 and the digital potentiometer 146. Even in such a case, it is possible to easily adjust the shift amount of the vibratory device 20 from the outside of the projector 1.

What is claimed is:

1. An image display device including:
    a display section adapted to display an image;
    a vibratory device adapted to vary a position of the image displayed by the display section;
    a circuit adapted to output a drive signal, which controls a variation of the position of the image due to the vibratory device; and
    a processor adapted to control the circuit and the vibratory device,
    wherein the circuit comprises:
        a gain adjustment section including:
            two variable resistors, the two variable resistors including a first variable resistor and a second variable resistor, each variable resistor being adapted to adjust amplitude of the drive signal, and a resistance value of the first variable resistor being configured to be adjusted from outside of the image display device;
            a first pair of resistors connected in series; and
            a second pair of resistors connected in series; and
        an amplifying section including an amplifier,
        the gain adjustment section being configured to adjust the gain of the amplifying section,
        the amplifying section being configured to generate the drive signal based on the gain adjusted by the gain adjustment section, and
        the first variable resistor and the second variable resistor being connected electrically in parallel between the first pair and the second pair of resistors.

2. The image display device according to claim 1, wherein the control section adjusts the resistance value of the one of the two variable resistors based on an operation from the outside of the image display device.

3. An adjusting device used for an image display device, the image display device including a processor and a vibratory device adapted to vary a position of an image to be displayed, the adjusting device comprising:
    a circuit adapted to output a drive signal, which controls a variation of the position of the image due to the vibratory device, the circuit comprising:
        a gain adjustment section including:
            two variable resistors, the two variable resistors including a first variable resistor and a second variable resistor, each variable resistor being adapted to adjust amplitude of the drive signal, and a resistance value of the first variable resistor being configured to be adjusted from outside of the image display device;
            a first pair of resistors connected in series; and
            a second pair of resistors connected in series; and
        an amplifying section including an amplifier,
        the gain adjustment section being configured to adjust the gain of the amplifying section,
        the amplifying section being configured to generate the drive signal based on the gain adjusted by the gain adjustment section, and
        the first variable resistor and the second variable resistor being connected electrically in parallel between the first pair and the second pair of resistors.

4. The image display device according to claim 1, wherein the amplifying section further includes two feedback resistors.

* * * * *